United States Patent [19]

Bedrosian

[11] Patent Number: 5,740,211
[45] Date of Patent: Apr. 14, 1998

[54] METHOD AND APPARATUS FOR A HITLESS SWITCH-OVER BETWEEN REDUNDANT SIGNALS

[75] Inventor: Paul Stephan Bedrosian, Andover, Mass.

[73] Assignee: Lucent Technologies Inc., Murray Hill, N.J.

[21] Appl. No.: 745,540

[22] Filed: Nov. 12, 1996

[51] Int. Cl.[6] .................................................. H04L 7/00
[52] U.S. Cl. ...................... 375/371; 375/376; 370/516; 327/147
[58] Field of Search .................................. 375/371, 376, 375/260; 370/516; 327/144, 147

[56] References Cited

U.S. PATENT DOCUMENTS

| | | | |
|---|---|---|---|
| 5,260,979 | 11/1993 | Parker et al. | 375/376 |
| 5,475,719 | 12/1995 | Gurtler et al. | 375/376 |
| 5,515,403 | 5/1996 | Sloan et al. | 375/371 |
| 5,631,896 | 5/1997 | Kawase et al. | 370/228 |

*Primary Examiner*—T. Ghebretinsae
*Attorney, Agent, or Firm*—Jack R. Penrod

[57] ABSTRACT

Real time switch overs from one set of timing signals to a redundant set of timing signals in an ATM system, as required by periodic maintenance checks, are accomplished without incurring data errors by this apparatus and method. Each switch over apparatus has a phase locked loop with a controlled control loop which assists the phase locked loop in rapidly achieving nearly perfect phase locks to one of multiple system reference clocks. The characteristics of the special phased locked loop provide the stability and the timing functions necessary for switch overs between reference clocks to produce errorless ATM signal handling.

11 Claims, 7 Drawing Sheets

| FIG. 9A | FIG. 9B |

FIG. 9B

METHOD AND APPARATUS FOR A HITLESS SWITCH-OVER BETWEEN REDUNDANT SIGNALS

TECHNICAL FIELD

The invention relates to the area of systems having redundant timing signals, and more particularly to a method and apparatus for accurately switching between redundant sets of clock and synchronization signals that have different phase positions, especially for switching between redundant clock and synchronization signals in asynchronous transfer mode (ATM) systems.

DESCRIPTION OF THE PRIOR ART

In larger ATM systems, standards of the telecommunications industry regarding availability essentially require the use of redundant sets of important timing signals. For ATM systems, these important signals are the data clock (hereinafter, simply clock) signal and the synchronization (hereinafter, sync) signal. These signals not only have tight frequency and duty cycle requirements, but they also have a close time relationship to each other. Violation of these timing requirements leads to a data error or interruption of data transmission, which is referred to in the an as a "hit". Using such a term, a perfect switch would be data error free or "hitless". One example of such a system is the GCNS-2000, Release II of the GlobeView 2000® ATM Switch by Lucent Technologies. Because the supply of hitless clock and sync signals is vital for the function of such systems, a hitless supply of clock and sync signals must be assured during any switch over to another set of clock and sync signals occasioned by a fault or routine on-line maintenance testing.

In systems with such redundancies, dual or plural sets of clock and sync signals are usually distributed via different routes within the system. Cross-connections are provided at numerous locations in the system, such that a switch over to one of the other sets of signals can be effected immediately in case of a fault. Because of the different routes, the sets of signals have different transit times. Simple switching between signal sets would inevitably lead to a phase jump which would further lead to counting and/or transferring hit(s). A conventional means of precise distribution of timing signals is to generate the signal to be distributed in a phase locked loop (PLL) whose input is the selected signal to be distributed. The PLL is slightly impaired by individual, brief errors, but nevertheless generates a gap-free output signal. If a switch is made at the PLL from the one input signal to another, similar one, which is identical in frequency, but having a different phase position, a phase jump is prevented; however, the result instead, is a longer transient oscillation to the phase position of the new input signal. This oscillation to this new phase position may indicate favorable data setup conditions and hits may occur. Clock pulse trains are particularly sensitive to these types of hits, and changes of this type in the phase are to be avoided.

A synchronous type of telecommunications system is described in U.S. Pat. No. 5,475,719 issued to Gürtler, et al. The timing requirements of that system are not as demanding as the ATM requirements. Furthermore, those systems use a single distribution line which leads to configurations that do not solve the switch over problems of ATM systems.

Therefore, it is an object of the present invention to provide reliable, hitless distribution of clock and sync signals during scheduled switch-overs between redundant sets of signals.

It is another object of the present invention to provide reliable, hitless distribution of clock and sync signals during fault-induced, unscheduled switch overs between redundant sets of signals.

SUMMARY OF THE INVENTION

Briefly stated, in accordance with one aspect of the invention, the aforementioned objects are achieved by providing a phase locked loop circuit that has a multiplexer that provides the switch over between reference clock trains. The phase locked loop characteristics are selected such that the controlled oscillator responds very slowly to changes to its reference input pulse train. This slow response provides a very stable clock pulse output, but one that does not change to a second reference input pulse train quickly. To improve the responsiveness of the phase lock loop of the present invention, a pulse alignment detector is added to check the alignment of the reference input pulse trains and the controlled oscillator clock output pulse train. If the input and output pulse trains are more than one cycle out of alignment, pulse blockers are used to exaggerate the error sensed by the phase detector by either dropping one or more reference input pulses to exaggerate the error voltage to slow down the controlled oscillator frequency, or dropping one or more oscillator output signal pulses to exaggerate the error voltage to speed up the controlled oscillator frequency. Once the alignment is within one cycle, both pulse blockers are inactivated so all pulses are passed and normal phase locked loop operation is effected. Thus, a phase locked loop that is both responsive to change and slow to change is achieved. The hitless switch device makes full use of this responsive, yet stable phase locked loop circuit by having switch overs between reference pulse trains be inhibited until the state of the next sync pulse. In this manner, a stable clock pulse train is realized, a stable sync train derived from the stable clock train is realized, and the inhibit circuit guarantees a fixed number of stable clock pulses between sync pulses.

DETAILED DESCRIPTION OF THE INVENTION

Figure 1:
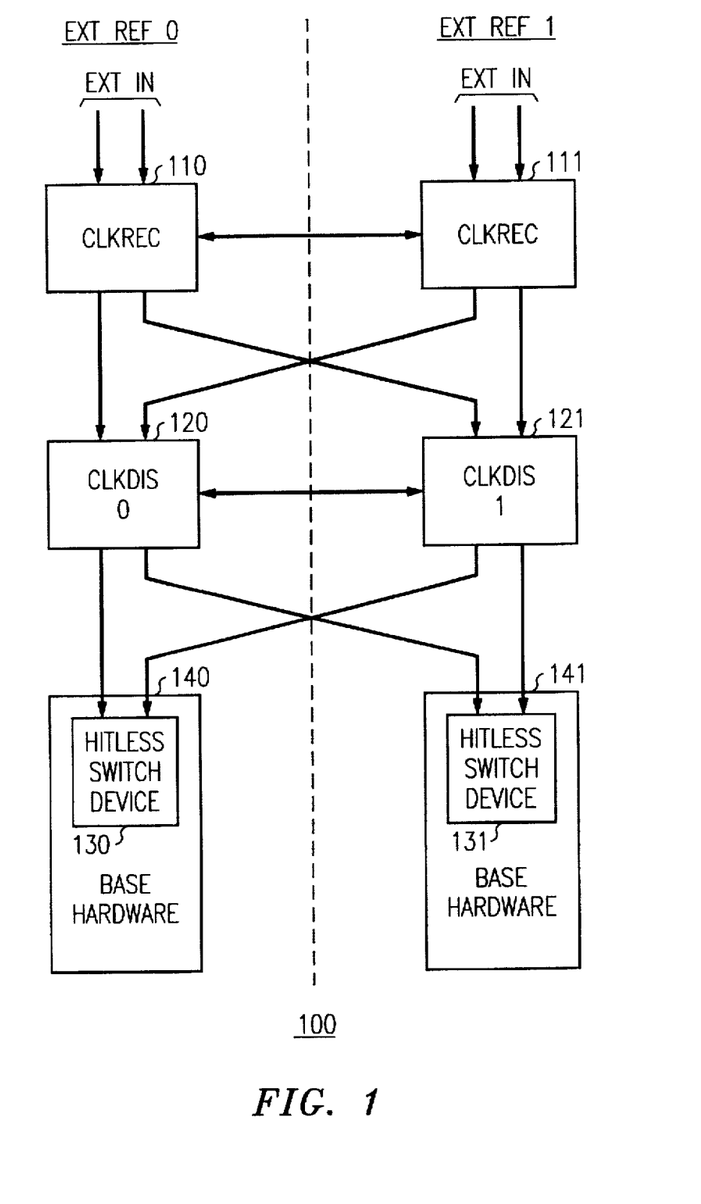
FIG. 1 is a block diagram of the timing architecture of an ATM system.

Referring to FIG. 1, an ATM system 100 is shown. ATM system 100 is dually redundant. It has two sides that are equivalent: side 0 and side 1. ATM system 100 is an example of a hot-spare arrangement, which means that each side and each module of each side is energized and ready to perform the required system function. For the present invention, the system function of interest is the timing function during normal, scheduled maintenance or fault avoidance operation.

Each side of ATM system 100 has a clock recovery module 110, 111. Clock recovery module 110 is connected to side 0 clock distribution module 120, and also to a side 1 clock distribution module 121. Similarly, clock recovery module 111 is connected to side 1 clock distribution module 120, and also to side 0 clock distribution module 121. This is a form of the cross-connections mentioned previously with respect to redundant systems.

Clock distribution module 120 is connected to side 0 hitless switch device 130, and also to a side 1 hitless switch device 13 1. Similarly, clock distribution module 121 is connected to side 1 hitless switch device 130, and also to side 0 hitless switch device 131. Hitless switch device 130 is connected to base hardware 140. Similarly, hitless switch 131 is connected to base hardware 141. In a preferred embodiment, hitless switch devices 130 and 131 are part of base hardware modules 140 and 141, respectively. Base hardware units 140 and 141 may be switching fabric interfaces, low speed data interfaces, line cards or other switch circuit paks (not shown).

Each hitless switch device 130, 131 provides hitless switching of the timing signals to its respective base hardware 140, 141 of either side 0 or side 1. Each hitless switch 130, 131 can provide a switch over between the sets of clock and sync signals of clock distribution modules 120 and 121 while still providing a seamless set of clock and sync output signals to base hardware 140, 141, respectively.

ATM base hardware 140 and ATM base hardware 141 require precise timing and synchronization information. This information is provided to ATM system 100 as stable and traceable external references. Clock recovery circuits 110, 111 provide the interface to redundant, external sources (not shown) and extract timing information therefrom. Clock recovery circuits 110, 111 working on concert, choose one of the external inputs to be the active reference and the other to be the standby reference. Timing and control information are shared between clock recovery circuits 110, 111 in order to provide redundant operation.

The output signals of clock recovery circuits 110, 111 are connected to clock distribution circuits 120, 121. There may be more than two clock distribution circuits located throughout the multiple shelves of system 100, but for the exemplary embodiment of FIG. 1 only two are shown. Timing information from both clock recovery circuits 110, 111 are connected to each clock distribution circuit 120, 121. Each of the clock distribution circuits 120, 121 transform this timing information and ultimately provides its distribution to all line card and fabric interface circuit paks on all shelves of the system 100. Normally two clock distribution circuits are used per shelf which connect to each line card or fabric interface on that shelf.

Redundant connections are integral to the synchronization architecture of the ATM system 100. This redundancy requires the ability to switch timing references without causing data errors. Such a switch between references is a hitless switch. Switches between references can arise because of diagnostic testing (maintenance switching) or because of the failure of an upstream stage (fault protection switching). In either case, provision is made by hitless switch devices 130, 131 to control such switch operations and provide a seamless phase transition between both input references.

Figure 2:
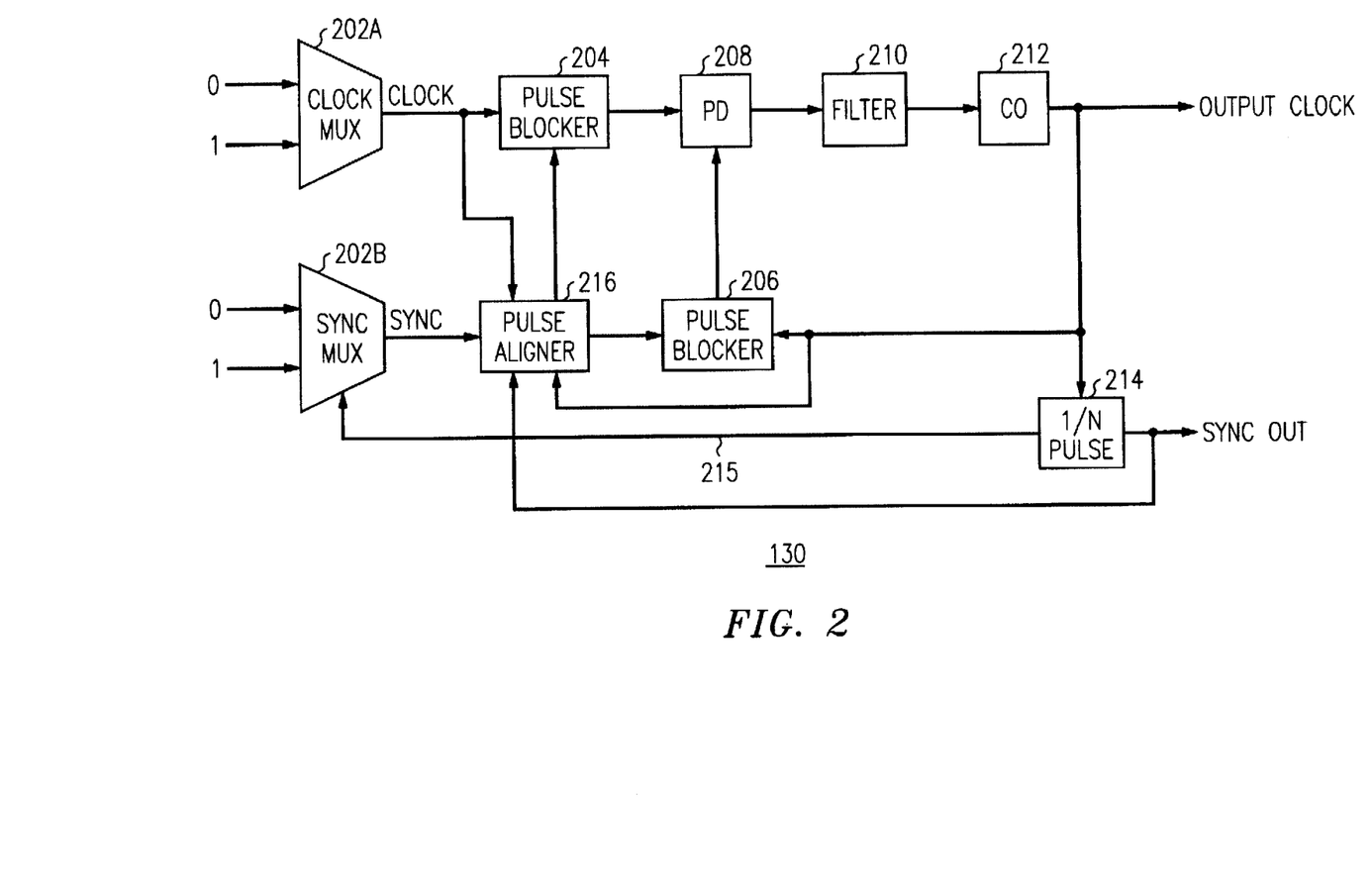
FIG. 2 is a functional block diagram of one of the hitless switch devices.

Referring now to FIG. 2, the side 0 hitless switch device 130 is shown. The other hitless switch device 131 and any others (not shown) are of identical design and operation as the described representative hitless switch device 130, so for brevity they will not be separately described. Hitless switch device 130 switches between the clock and sync signals of equal average frequency while preserving the timing nature of these two signals. The required timing relationship between the clock and sync signals is that the rising edge of the sync signals is clocked with the rising edge of the corresponding clock signal, occurring at the same time.

Due to device and cable propagation delays within system 100, timing skews of several nanoseconds can occur. In relation to the standard ATM clock rates of 155.52 MHz (6.43 ns) or 92.16 MHz (10.85 ns), these delays are less than one cycle. If a simple multiplexer type device were used to select between the sets of clock signals and sync signals, the resulting output timing signals may result in varying duty cycles, double pulses, or runt pulses. Any variation of duty cycle width greater than approximately 200 ps will cause a timing hit. Timing hits will also occur if the number of clock cycles between the sync pulses does not stay constant during and after a switch.

The hitless switch device 130 derives both output clock and sync signals from the reference signals using a simple unit multiplying PLL and a pulse generator. Cycle detection circuitry provides a "coarse" phase adjustment to align the input sync signal with the output sync signal. This "coarse" adjustment is performed by causing the PLL to undergo a series of controlled cycle slips until the sync signals are aligned to less than one clock cycle. Once the phase adjustment is that close, a "fine" phase adjustment is then performed where the PLL's edge-triggered phase detector aligns both the clock and the sync signals within a few hundred picoseconds.

The hitless switch device 130 has an input multiplexer 202 which is connected to clock distribution circuits 120, 121 and is capable of receiving a side 0 set of clock and sync signals, and a side 1 set of clock and sync signals therefrom. Input multiplexer 202 selects between these sets of clock and sync signals from sides 0 or side 1. The switching selection is controlled either by input failure monitors or by a manual command (not shown).

Pulse blocking circuits 204, 206 when enabled, block or delete every alternate pulse. Pulse blocker circuits 204, 206 are used to decrease the frequency of the input clock or the output clock by a factor of two, respectively. Such deletions can change the amount of error within the PLL and stimulate the controlled oscillator 212 within the loop to speed up or slow down.

Figure 3:
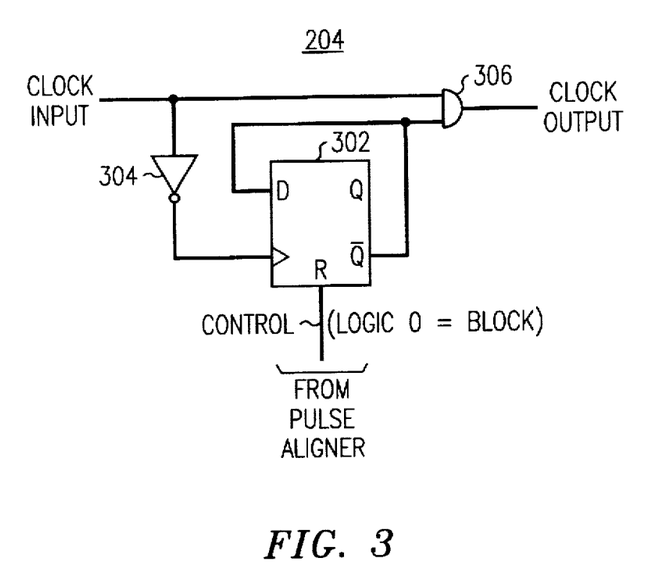
FIG. 3 is a logic diagram of a controlled pulse blocking device shown in FIG. 2.
Figure 4:
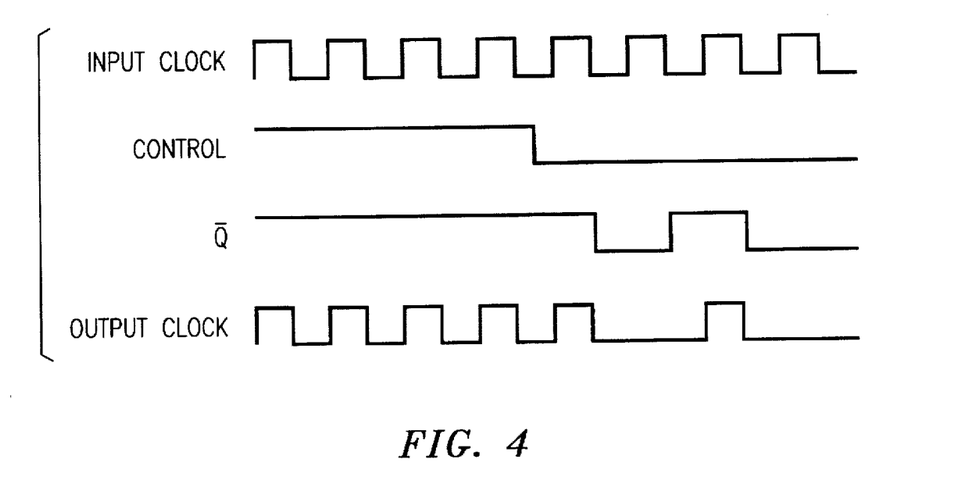
FIG. 4 is a waveform plot illustrating the operation of the pulse blocking device of FIG. 3.
Figure 5:
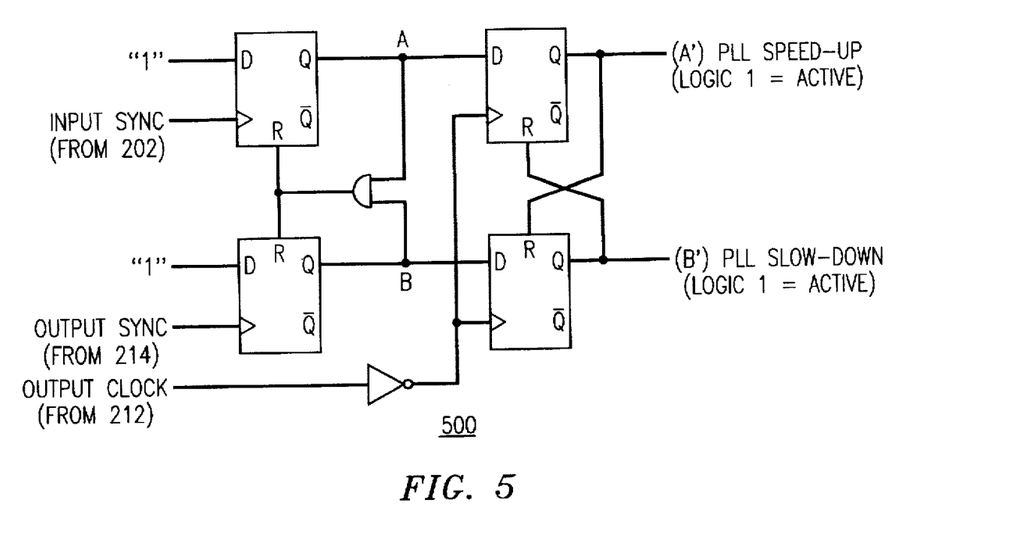
FIG. 5 is a logic diagram of a leading pulse detector that is part of the pulse aligner shown in FIG. 2.

Referring now to FIG. 3, one embodiment of pulse blocking circuit 204 is shown. Pulse blocking circuit has a D flip-flop 302 with its data input (D) connected to its inverted output (NOTQ). A control signal is connected to the asynchronous reset (R) of the D flip-flop 302. The timing signal input is connected to the input of an inverter 304 and to an input of an AND gate 306. The output of inverter 304 is connected to the clock input of the D flip-flop 302. The inverted output (NOTQ) of D flip-flop 302 is connected to a second input of AND gate 306. The output of pulse blocking circuit 204 is the output of AND gate 306. When the control signal to the reset input of flip-flop 302 is a logic 1, the Clock Out and Clock In signals are identical. When this control signal is a logic 0, alternating input pulses of the input pulse train signal are deleted, resulting in an output signal from pulse blocking circuit 204 that has fewer pulses than its input signal. The operation of pulse blocking circuit and its waveforms are shown by FIG. 5. Pulse blocking circuit 206 is identical to pulse blocking circuit 204 in logic and pulse blocking operation.

Referring again to FIG. 2, phase detector 208 is an edge triggered phase detector, many types of which are well known in the PLL art. Phase detector 208 has a first input connected to the output of pulse blocking circuit 204, and a second input connected to the output of pulse blocking (dropping) circuit 206. The output of phase detector 208, represents the difference between the two signals on its inputs. This is a type of error signal used by the PLL to make frequency and/or phase adjustments.

The output of phase detector 208 is connected to an input of filter 210, which in a preferred embodiment is an active low pass filter of a second order. Filter 210 is specially tuned to provide the desired loop dynamic operation. Any gain required for loop operation may be provided as part of filter 210. Important loop parameters that are typically taken into account for in the design of a filter-like filter 210 are the phase detector gain constant, VCO gain constant, feed back divider, natural frequency and damping constant (Zeta). Such PLL parameters are well known in the art.

The output of filter 210 is connected to a control terminal of a controlled oscillator 212. In a preferred embodiment, controlled oscillator 210 is a voltage controlled oscillator, which is tunable to a center frequency (e.g., 155.52 MHz or 92.16 MHz) and has a minimum pull range of ±20 parts per million. The output of controlled oscillator 212 is the clock output of the hitless switch device 130.

The output of controlled oscillator 212 is also fed back through pulse blocking circuit 206 to the second input of the phase detector 208. This closes the loop of the PLL. This PLL differs from standard PLLs because of the operation of pulse blocking circuits 204 and 206, and the control circuits of pulse blocking circuits 204 and 206, which are part of pulse aligner 216.

Also connected to the output of controlled oscillator 212 is an input of 1/N pulse circuit 214. 1/N pulse circuit 214 outputs a sync pulse after N cycles of the controlled oscillator output. N is selected such that 1/N pulse circuit 214 produces on its output an 8 KHz sync pulse signal. Thus, N=19,440 for a clock rate of 155.52 MHz and N=11,520 for a clock rate of 91.16 MHz. If some other sync pulse rate, such as 2 KHz were used, then N for such a case would be 77,760 for a clock rate of 155.52 MHz, and 46,080 for a clock rate of 93.16 MHz. In a preferred embodiment, the 1/N pulse circuit includes a counter to provide the divide by N function. Either an up or a down counter could be used. The width of the sync pulse produced by 1/N pulse circuit is controlled to be equal to one clock period of the corresponding clock frequency. Additionally, the pulse shall be clocked to the output of 1/N pulse circuit 214 with the output clock signal from controlled oscillator 212 for precise clock and sync timing.

The output of 1/N pulse circuit 214, besides being the sync pulse output, is also connected to an input of pulse aligner 216. Pulse aligner 216 senses the phase difference between the input sync signal to pulse aligner 216 and sync output signal from 1/N pulse circuit 214, and adjusts the frequency of the PLL so that a phase difference of less than 1 clock cycle exists therebetween. The phase difference is sensed by sensing circuit 500 shown in FIG. 5. Sensing circuit 500 is part of the pulse aligner 216.

1/N pulse circuit has a second output which is connected back by line 215 to multiplexer 202. The signal on line 215 is a control signal that inhibits multiplexer 202 from switching between reference signal sets until the current division by N is completed. This is to prevent any hits from happening during a maintenance switch over between signal sets by preventing switching in between two sync pulses and the problems that can occur. The inhibit signal on line 215 does not affect the multiplexer's switching in case of a fault, which is asynchronous and as rapid as possible. The reason for switching rapidly because of a fault is to reduce the likelihood of corrupting data as much as possible.

Figure 6:
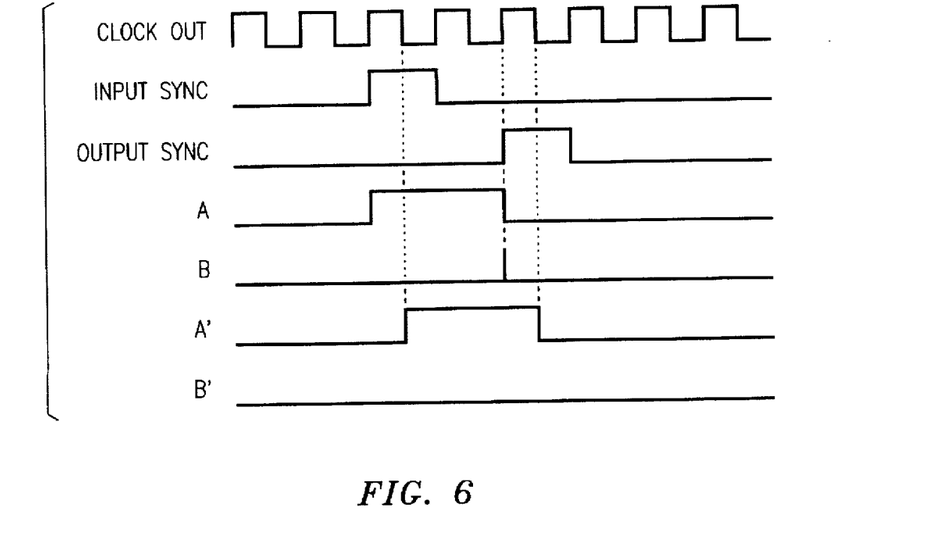
FIG. 6 is a waveform plot illustrating the operation of the leading pulse detector shown in FIG. 5.

Referring now to FIGS. 2 and 5, the operation of sensing circuit 500 will be detailed. Sensing circuit 500 provides a signal to the A' or B' outputs, depending on which sync signal leads the other sync signal. If the input sync signal from multiplexer 202 leads the output sync signal from 1/N pulse circuit 214, then the controlled oscillator frequency must increase which means a PLL Speed-Up is required. Similarly, if the input sync signal from multiplexer 202 lags the output sync signal from 1/N pulse circuit, then the controlled oscillator 212 frequency must decrease which means a PLL Slow-Down is required. The signal on the A' or B' output stays active for the duration of the phase difference. This operation of circuit 500 is illustrated by the waveform plots of FIG. 6.

Figure 7:
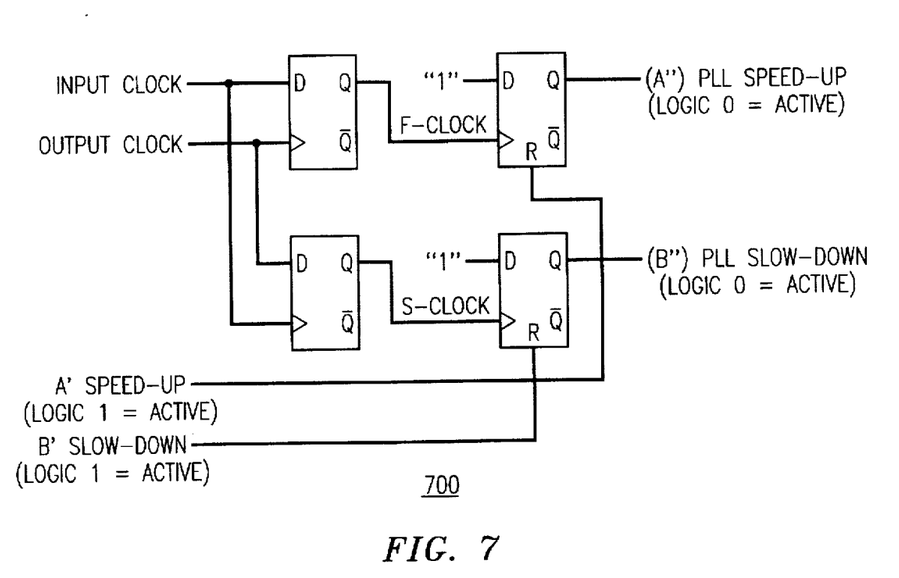
FIG. 7 is a logic diagram of a cycle slip controller that is also part of the pulse aligner shown in FIG. 2.

A second sensing circuit 700 is shown in FIG. 7. Sensing circuit 700, which is the second part of pulse aligner 216, is connected to and uses the A' and B' signals from sensing circuit 500 of FIG. 5 and provides control to the pulse blocking circuits 204, 206. Activating pulse blocking in the PLL's feed-forward direction, i.e., pulse blocker 204, causes the PLL to decrease in frequency. Similarly, activating pulse blocking in the PLL's feedback direction, i.e., pulse blocker 206, will cause the PLL to increase in frequency. By this operation, the PLL of hitless switch device 130 can adjust its frequency in a first manner to be in phase with whichever reference clock and sync signals it is connected.

Figure 8:
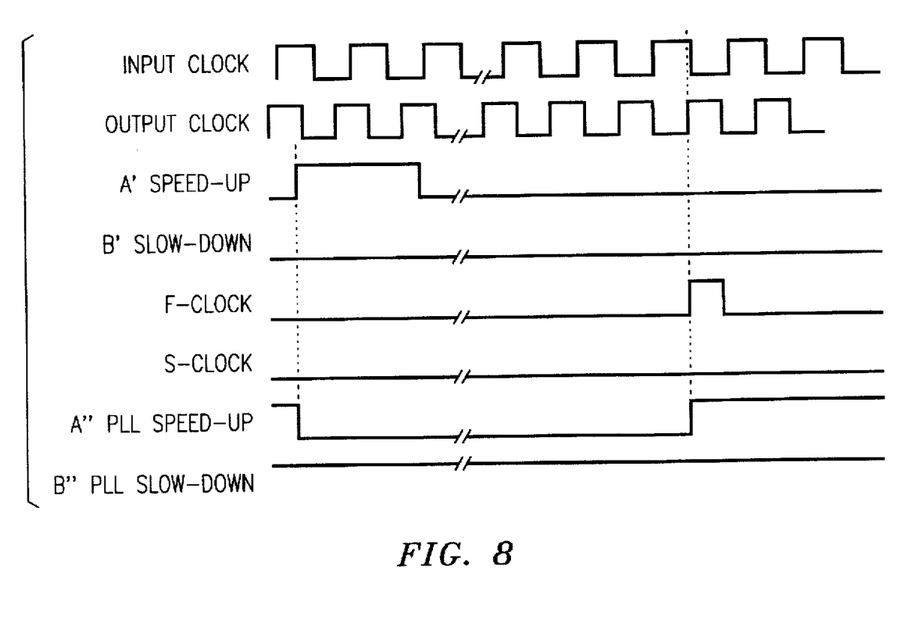
FIG. 8 is a waveform plot illustrating the operation of the cycle slip controller shown in FIG. 7.

The sensing circuit 700 also monitors the relative phase of the input clock signal from multiplexer 202 and the output clock signal from controlled oscillator 212. Should the Speed-Up or Slow-Down control become active, the appropriate control will be applied at the A" or B" outputs until either a one cycle slip occurs between the input clock signal from the multiplexer 202 and the output clock signal from controlled oscillator 212, or either the Speed-Up or Slow-Down control becomes inactive (NOTE: Speed-Up and Slow-Down are binary complements when active and can only both be active for brief transient times, if at all.) An example of the operation of sensing circuit 700 is illustrated in the waveform plots of FIG. 8. Thus, the PLL of hitless switch device 130 can adjust its frequency in a second manner in order to be in phase with whichever reference clock and sync signals it is connected. The operation of pulse aligner 216 uses both sensing circuit 500 and sensing circuit 700 to sense and correct phase differences between the active set of reference clock and sync signals and the set of clock and sync signals outputted from the hitless switch device 130.

Figure 9A:
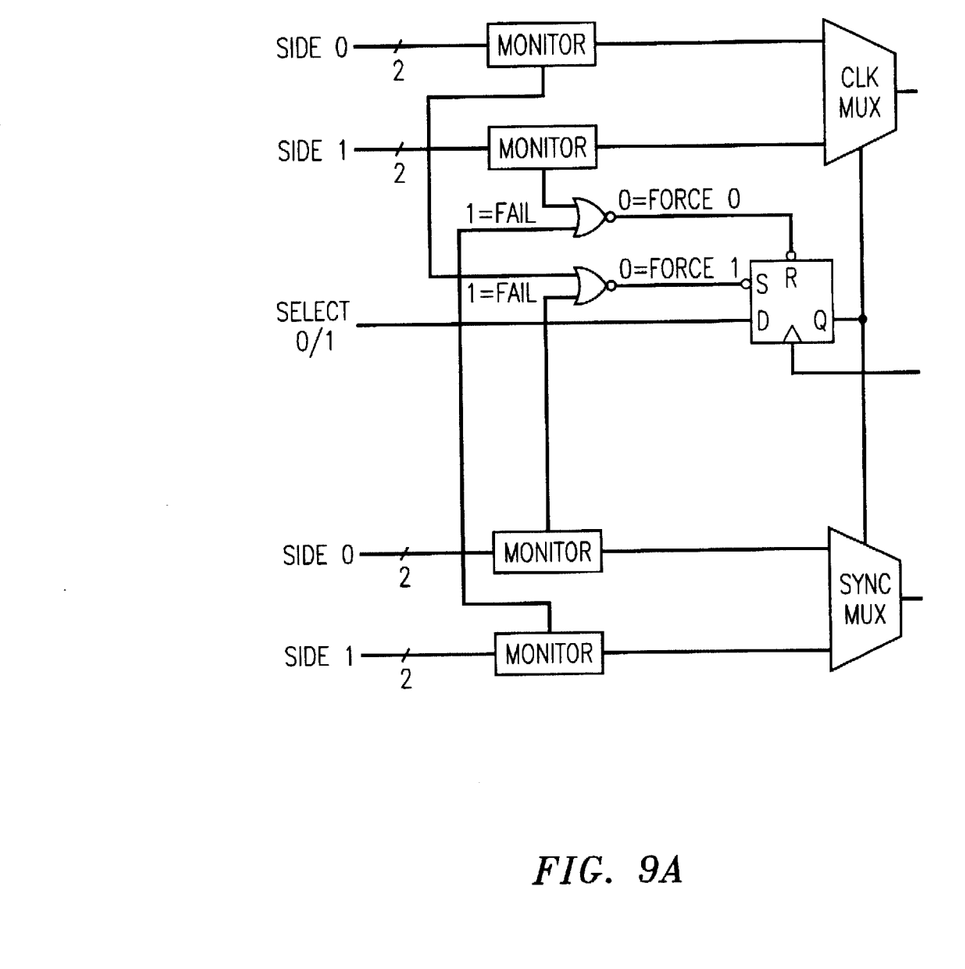
FIGS. 9A and 9B, when joined together as shown in FIG. 10, form a detailed logic diagram of the hitless switch device shown in FIG. 2.
Figure 9B:
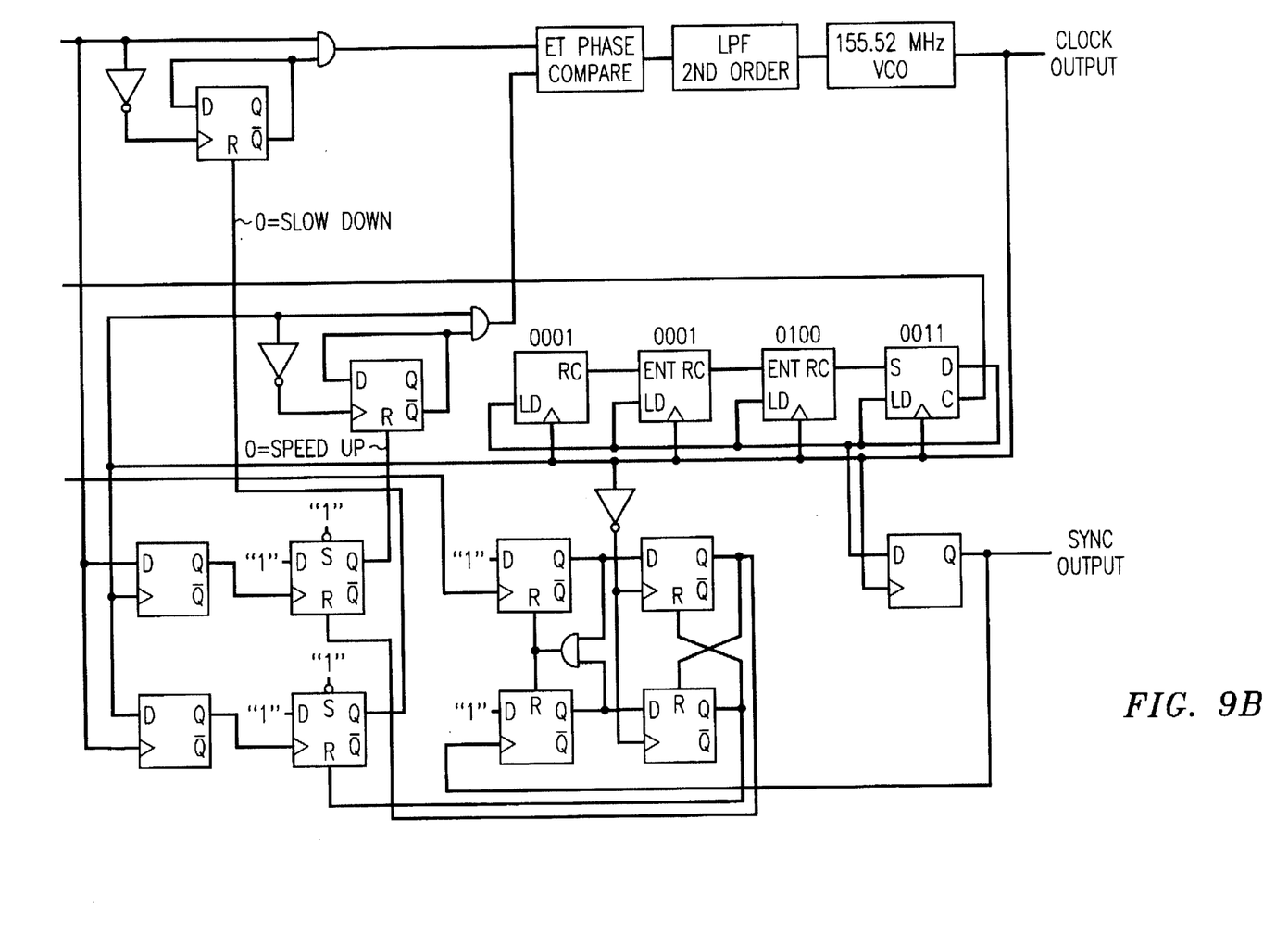
Figure 10:
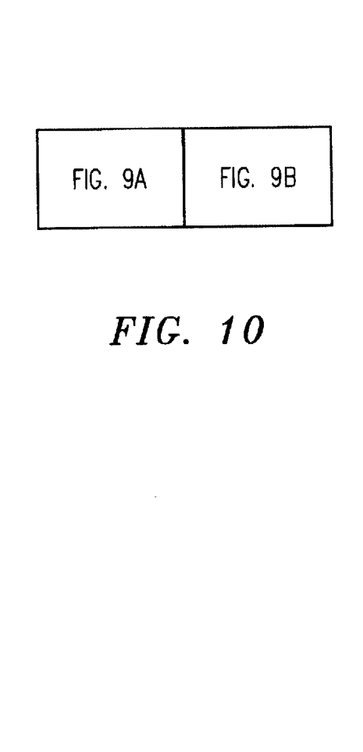

FIGS. 9A and 9B show, in a detailed logic diagram, one embodiment of hitless switch device 130. Except for the details of multiplexer 202 and 1/N pulse circuit 214, these details have been described above. Thus, FIGS. 9A and 9B show the integration of all the previously described circuits to provide the hitless switch device functions.

System Operation

The hitless switch has two defined modes of operation: Cycle Acquisition Mode and Steady State Mode.

During the Cycle Acquisition Mode, the phase of the output sync signal is adjusted until it is aligned with the input sync signal, to within one clock cycle. Cycle Acquisition Mode occurs for initial loop start-up or after a switching transition where the input sync signal and the output sync signal differ by more than one clock cycle.

Phase adjustment is primarily controlled by Pulse Aligner 216 and executed by the pulse blocker circuits 204, 206. As previously described, Pulse Aligner 216 will activate the appropriate pulse blocker 204, 206 for the duration of the phase difference between the input sync and output sync, for at least one cycle slip between the input clock and the output clock signals. Pulse blocking deletes alternate clock pulses in either the feed back or feed forward path of the PLL and effectively causes the PLL's controlled oscillator to increase or decrease in frequency. Once the phase difference between the input sync signal and output sync signal are within one clock cycle, the pulse blocker ceases to block or delete alternate pulses mad allows the PLL to stabilize.

Steady State Mode occurs when the input sync signal and the output sync are aligned to within one clock cycle. Once in Steady State Mode, all loop control is provided by the edge triggered phase detector. The pulse blocker circuits 204, 206 do not delete alternating pulses in this mode. Therefore, during Steady State Mode the PLL loop behaves in the classical sense with no effect from the pulse blockers 204, 206 or pulse aligner 216. As mentioned previously, a second order filter is one example of an appropriate filter.

Thus, it will now be understood that there has been disclosed a method and apparatus for providing a hitless switch-over between redundant timing signals. While the invention has been particularly illustrated and described with reference to preferred embodiments thereof, it will be understood by those skilled in the art that various changes in form, details and applications may be made therein. For example, different order filters may be used and current controlled oscillators may also be used. It is accordingly intended that the appended claims shall cover all such changes in form, details and applications which do not depart from the true spirit and scope of the invention.

I claim:

1. An apparatus for switching between a plurality sets of data pulse trains without incurring a data error, comprising:
    a multiplexer for selecting one set of pulse trains from the plurality of pulse train sets to be connected to a set of multiplexer output terminals, said selected set of pulse trains including a clock pulse train and a synchronization pulse train which are delivered to a clock output terminal and a synchronization output terminal, respectively;
    a first pulse dropping means for selectively dropping at least one pulse of the selected clock pulse train having an input connected to said clock output terminal and an output terminal;
    a phase detector having a first input connected to said output of said first pulse dropping means, a second input and an output;
    a filter having an input connected to said output of said phase detector and an output;
    a controlled oscillator having a control input connected to said output of said filter and an output
    a divide by N means connected to said output of said controlled oscillator for providing at an output thereof a pulse very similar to one of the pulses of said controlled oscillator for every N pulses of said controlled oscillator, where N is an integer,
    a second pulse dropping means having a clock input connected to said controlled oscillator output, a control input and an output which is connected to said second input of said phase detector; and
    a pulse aligner having a first input connected to said output of said divided by N means, a second input connected to said synchronization output terminal of said multiplexer, a first output connected to said first pulse dropping means and a second output connected to said second pulse dropping means,
    said pulse aligner senses the difference between said synchronization pulse train from said multiplexer and said output of said divide by N means and controls said first and second pulse dropping means to drop pulses from their respective trains to drive said phase detector to control said oscillator to reduce the difference sensed by said pulse aligner until said difference is very small, upon reaching said very small difference sensed by said pulse aligner, said first and second pulse dropping means are disabled and become essentially closed switches allowing said phase detector to drive said controlled oscillator in typical phase locked loop operation.

2. The apparatus of claim 1, wherein said controlled oscillator output is a hitless clock signal and said divide by N means output is a hitless sync signal output.

3. The apparatus of claim 2, further comprising:
    a second output of said divide by N means connected to a control input of said multiplexer for inhibiting a switch-over to another set of said plurality of pulse train sets until the occurrence of a next hitless sync signal.

4. An apparatus for switching between two sets of data pulse trains without incurring a data error, comprising:
    a multiplexer for selecting one set of pulse trains from a plurality of pulse train sets to be connected to a set of multiplexer output terminals, said selected set of pulse trains including a clock pulse train and a synchronization pulse train which are delivered to a clock output terminal and a synchronization output terminal, respectively;
    a first pulse dropping means for selectively dropping at least one pulse of the selected clock pulse train having an input connected to said clock output terminal and an output terminal;
    a phase detector having a first input connected to said output of said first pulse dropping means, a second input and an output;
    a filter having an input connected to said output of said phase detector and an output;
    a controlled oscillator having a nominal operating frequency and a range of variation around said nominal operating frequency within which the output frequency of its output pulse train may be controlled, said controllable oscillator having a control input connected to said output of said filter and an output;
    a second pulse dropping means having an input connected to said output of said controllable oscillator for selectively dropping at least one pulse of the output pulse train of said controlled oscillator and an output connected to a second input of said phase detector;
    a divide by N means also having an input connected to said controlled oscillator means for developing one pulse for every N pulses of said controlled oscillator pulse train at an output thereof;
    a pulse aligner having one input connected to said output of said divide by N means, a second input connected to said synchronization terminal output and a pair of outputs, one of said pulse aligner outputs is a speed up output and the other pulse aligner output is a slow down output;

said speed up output is connected to a control input of said first pulse dropper for selecting a pulse of said clock pulse train to be dropped; and said slow down output is connected to a control input of said second pulse dropper for selecting a pulse of said controlled oscillator pulse train to be dropped;

wherein even during a switch over between two sets of pulse trains, said controlled oscillator pulse train from said controlled oscillator and said pulse train developed by said divide by N means provide a sufficiently stable set of pulse trains to serve as clock and synchronization pulse trains for data transmission without a data error.

5. The apparatus of claim 4, wherein said filter is a second order low pass filter.

6. The apparatus of claim 4, wherein said controlled oscillator is a voltage controlled oscillator.

7. The apparatus of claim 4, wherein each of said pulse droppers drops every other pulse when selected.

8. The apparatus of claim 4, wherein said multiplexer selects between a first set of a clock pulse and a sync pulse trains, and a second set of clock pulse and sync pulse trains.

9. The apparatus of claim 4, wherein said pulse droppers, said phase detector, said filter, said controlled oscillator, said divide by N means and said pulse aligner together form a type of phase locked loop.

10. The apparatus of claim 9, wherein said phase locked loop has the following characteristics: the filter is a second order low pass filter and the controllable oscillator is runable to the desired center frequency with a minimum pull range.

11. A circuit apparatus comprising:

a phase locked loop having a series loop, a two input phase detector, a filter, a controlled oscillator and a feedback path from an output of said controlled oscillator to one of said two inputs of said phase detector, a first pulse blocking means having an output connected to a first of said two inputs of said phase detector and an input, said input of said second pulse blocking means connected to a reference clock pulse train, a second pulse blocking means having an output connected in said feedback path to a second input of said phase detector and an input, said input of said second pulse blocking means connected to an output signal of said controlled oscillator; and adjustment means for comparing said reference clock pulse train to said output signal of said controlled oscillator such that said output signal of said controlled oscillator is slowed by activating said first pulse blocking means to block at least one pulse of said reference clock pulse train from reaching said phase detector if said output signal of the controlled oscillator is too fast, sped up by activating said second pulse blocking means to block at least one pulse of said output signal of said controlled oscillator from being fed back to said phase detector if said output signal of said controlled oscillator is too slow, and not activating either of said pulse blocking means from blocking pulses if said output signal of said controlled oscillator is substantially the same as the same frequency as said reference clock pulse train.

* * * * *

UNITED STATES PATENT AND TRADEMARK OFFICE
CERTIFICATE OF CORRECTION

PATENT NO. : 5,740,211
DATED : April 14, 1998
INVENTOR(S) : Paul Stephan Bedrosian It is certified that error appears in the above-identified patent and that said Letters Patent is hereby corrected as shown below:

Column 9, claim 10,
Line 33, change "runable" to -- tunable --.

Column 10, claim 11,
Line 9, change "second" to -- first --.

Signed and Sealed this

Twenty-third Day of October, 2001

*Attest:*

NICHOLAS P. GODICI
*Attesting Officer*   *Acting Director of the United States Patent and Trademark Office*